(12) United States Patent
Khatiwada et al.

(10) Patent No.: US 10,458,197 B2
(45) Date of Patent: Oct. 29, 2019

(54) DISINTEGRATABLE POLYMER COMPOSITES FOR DOWNHOLE TOOLS

(71) Applicants: Suman Khatiwada, Houston, TX (US); Yusheng Yuan, Houston, TX (US); Anil K. Sadana, Houston, TX (US)

(72) Inventors: Suman Khatiwada, Houston, TX (US); Yusheng Yuan, Houston, TX (US); Anil K. Sadana, Houston, TX (US)

(73) Assignee: BAKER HUGES, A GE COMPANY, LLC, Houston, TX (US)

( * ) Notice: Subject to any disclaimer, the term of this patent is extended or adjusted under 35 U.S.C. 154(b) by 373 days.

(21) Appl. No.: 15/149,237

(22) Filed: May 9, 2016

(65) Prior Publication Data

US 2016/0369083 A1 Dec. 22, 2016

Related U.S. Application Data

(60) Provisional application No. 62/180,098, filed on Jun. 16, 2015.

(51) Int. Cl.
| | |
|---|---|
| *C08K 3/34* | (2006.01) |
| *C08K 7/14* | (2006.01) |
| *E21B 33/12* | (2006.01) |
| *C08K 3/40* | (2006.01) |

(52) U.S. Cl.
CPC ............. *E21B 33/12* (2013.01); *C08K 3/40* (2013.01)

(58) Field of Classification Search
CPC .................................. C08K 3/34; C08K 7/14
USPC ........................................................ 524/494
See application file for complete search history.

(56) References Cited

U.S. PATENT DOCUMENTS

| | | | |
|---|---|---|---|
| 5,245,841 | A | 9/1993 | Paul et al. |
| 7,093,664 | B2 | 8/2006 | Todd et al. |
| 7,353,879 | B2 | 4/2008 | Todd et al. |
| 8,672,041 | B2 | 3/2014 | Duphorne |
| 8,877,841 | B2 | 11/2014 | Yano et al. |
| 2005/0205265 | A1 | 9/2005 | Todd et al. |
| 2006/0093824 | A1* | 5/2006 | Nozaki ............. B32B 15/08 428/411.1 |
| 2007/0243995 | A1* | 10/2007 | Dallies ................. C03C 13/002 501/135 |
| 2012/0168152 | A1 | 7/2012 | Casciaro |
| 2012/0181032 | A1 | 7/2012 | Naedler et al. |
| 2013/0143459 | A1* | 6/2013 | Li .......................... C03C 13/00 442/180 |
| 2014/0295363 | A1 | 10/2014 | Sun et al. |

FOREIGN PATENT DOCUMENTS

| | | |
|---|---|---|
| CA | 1074481 A | 3/1980 |
| EP | 0396383 A2 | 11/1990 |
| WO | 2012091984 A2 | 11/2012 |
| WO | 20130175448 A1 | 11/2013 |
| WO | 2014072923 A1 | 5/2014 |
| WO | 2014189766 A2 | 11/2014 |
| WO | 2015016878 A1 | 2/2015 |

OTHER PUBLICATIONS

"Soluble Silicates: SIDS Initial Assessment Report", The Organization for Economic Co-operation and Development, UNEP Publications, Paris, France, Apr. 20-23, 2004.
Chin et al., "Elevated temperature aging of glass fiber reinforced vinyl ester and isophthalic polyester composites in water, salt water and concrete pore solution", 16th Technical Conference Proceedings, Sep. 9-12, 2001, Blacksburg, VA, pp. 1-12.
Clark et al., Corrosion of Glass, Books of Industry, 1979, pp. 1-39.
International Search Report, International Application No. PCT/US2016/031846, dated Aug. 22, 2016, Korean Intellectual Property Office; International Search Report 4 pages.
Kasehagen et al. "Hydrolysis and blistering of cyanate ester networks", Journal of Applied Polymer Science, 64.1, 1997, pp. 107-113.
Lower et al., "Inert failure strain studies of sodium silicate glass fibers", Journal of Non-Crystalline Solids, vol. 349, 2004, pp. 168-172.
European Search Report, EP Application No. 16812100.2, dated Dec. 13, 2018, EP Patent Office; EP Search Report 6 pages.

\* cited by examiner

*Primary Examiner* — Deve E Valdez
(74) *Attorney, Agent, or Firm* — Cantor Colburn LLP

(57) ABSTRACT

A disintegrable polymer composite comprises: a polymer component comprising one or more of the following: a cured cyanate ester; a crosslinked unsaturated polyester; or a crosslinked vinyl ester resin; and dissolvable glass comprising about 55 to about 80 wt. % of $SiO_2$, 0 to about 35 wt. % of $Na_2O$, 0 to about 35 wt. % of $K_2O$, 0 to about 20 wt. % of CaO, 0 to about 10 wt. % of MgO, provided that the sum of the weights of $Na_2O$ and $K_2O$ is about 20 wt. % to about 40 wt. %, wherein each weight percent is based on the total weight of the dissolvable glass.

21 Claims, 2 Drawing Sheets

DISINTEGRATABLE POLYMER COMPOSITES FOR DOWNHOLE TOOLS

CROSS-REFERENCE TO RELATED APPLICATION

This application is a continuation of U.S. Provisional Patent Application Ser. No. 62/180,098, filed Jun. 16, 2015, the disclosure of which is incorporated by reference herein in its entirety.

BACKGROUND

Downhole constructions including oil and natural gas wells, $CO_2$ sequestration boreholes, etc. often utilize borehole components or tools that, due to their function, are only required to have limited service lives that are considerably less than the service life of the well. After a component or tool service function is complete, it must be removed or disposed of in order to recover the original size of the fluid pathway for uses such as hydrocarbon production and $CO_2$ sequestration. Disposal of components or tools can be accomplished by milling or drilling the component or by tripping the tool out of the borehole. Each of these is generally time consuming and expensive. The industry would be receptive to new materials, and methods that remove a component or tool from a borehole without such milling and drilling operations.

BRIEF DESCRIPTION

The above and other deficiencies in the prior art are overcome by, in an embodiment, a disintegrable polymer composite comprising: a polymer component comprising one or more of the following: a cured cyanate ester; a crosslinked unsaturated polyester; or a crosslinked vinyl ester resin; and dissolvable glass comprising about 55 to about 80 wt. % of $SiO_2$, 0 to about 35 wt. % of $Na_2O$, 0 to about 35 wt. % of $K_2O$, 0 to about 20 wt. % of CaO, 0 to about 10 wt. % of MgO, provided that the sum of the weights of $Na_2O$ and $K_2O$ is about 20 wt. % to about 40 wt. %, wherein each weight percent is based on the total weight of the dissolvable glass.

An article comprising the polymer composite is also disclosed.

A method to disintegrate a downhole article comprises exposing the downhole article to an aqueous fluid at a temperature of about 25° C. to about 300° C.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
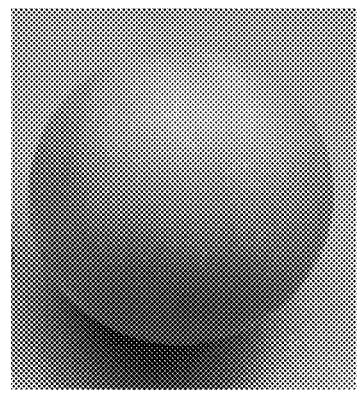
FIG. 1 is a picture of a polymer composite ball having a diameter of 2.625 inches.

Disclosed herein are polymer composites that may be used in a wide variety of applications and application environments, including use in various wellbore environments to make selectively and controllably disposable or degradable downhole tools or other downhole components. These polymer composites include a polymer component and a dissolvable glass component, wherein the polymer component comprises one or more of the following: a cured cyanate ester; a crosslinked unsaturated polyester; or a crosslinked vinyl ester resin.

The polymer composites provide a unique and advantageous combination of high tensile strength, high collapse pressure, and rapid and controlled dissolution in various wellbore fluids such as water, brine, or an alkaline solution at elevated temperatures. For example, applicants found that by forming a polymer composite containing dissolvable glass such as dissolvable glass fiber, the tensile strength of the polymer component can be greatly increased. Advantageously, the glass dissolves in brine, water, or an alkaline solution at elevated temperatures. The dissolution of the glass according to the disclosure increases the pH of the fluid, which accelerates the disintegration or the dissolution of the polymer component.

In another embodiment, the tools or components made from the polymer composites are able to degrade their mechanical strength and eventually break up without any additional mechanical or hydraulic forces. For example, when contacted with wellbore fluids at elevated temperatures, the corrosion rate of the polymer composites can be controlled in such a way that the tools or components can maintain their geometry with acceptable but degrading mechanical properties until they are no longer needed, at which time, the tools and components can break and be easily removed.

As used herein, the term "dissolvable glass" refers to a glass material that has a solubility in water of greater than about 15 grams/100 mL at 25° C. At elevated temperatures, the dissolvable glass can completely dissolve in a short period of time. In an embodiment, the glass as disclosed herein dissolves in 100° C. water in about 2 to 4 hours.

The dissolvable glass comprises about 55 to about 80 wt. % of $SiO_2$, 0 to about 35 wt. % of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, about 20 wt. % to about 35 wt. %, or about 22 wt. % to about 33 wt. %, wherein each weight percent is based on the total weight of the dissolvable glass. In an embodiment, the dissolvable glass comprises at least one of sodium silicate or potassium silicate. Preferably the dissolvable glass comprises sodium silicate having a formula of $Na_2O \cdot SiO_2$, wherein the weight percent of $SiO_2$ relative to $Na_2O$ is about 3.22: 1 to about 1:1, about 3.22:1 to about 2.5:1, specifically about 2:1 to about 1:1.

Dissolvable glass can be supplied in various forms, for example, continuous glass fiber; chopped glass fiber; a glass fabric; a glass fiber mat; a glass fiber sheet; a glass fiber braid; a glass fiber roving; a glass fiber prepreg product, a glass powder, glass beads, or glass flakes. The glass fibers can be woven or non-woven. In a specific embodiment, the dissolvable glass comprises glass fibers. In another specific embodiment, the dissolvable glass comprises continuous glass fibers.

Dissolvable glass fibers have a round or flat cross-section. In an embodiment, the dissolvable glass fibers have an average diameter of about 5 microns to about 500 microns, specifically about 25 microns to about 250 microns, and more specifically about 50 microns to about 200 microns. As used herein, the average diameter refers to the average largest dimension of the cross-section of the glass fibers.

The dissolvable glass fibers can be used in any suitable length, for example lengths of about 0.8 millimeter to about 6 millimeter in short chopped fibers, 0.6 centimeters to 5 centimeter in long chopped fibers. In an embodiment, the glass fibers comprise continuous glass fibers in yarn, roving or fabric forms without a discontinuity. The dissolvable glass fibers may be made by processes such as steam or air blowing, flame blowing, mechanical pulling or by direct melting of the glass in a furnace followed by feeding through bushings of fine orifices. The fibers may be sized or unsized. Sized glass fibers are generally coated on at least a portion of their surfaces with a sizing composition selected for compatibility with the polymer matrix material. The sizing composition facilitates wet-out and wet-through of the organic polymer upon the fiber strands and assists in attaining selected physical properties in the composite.

The glass fibers can be present as glass strands. In preparing the glass fibers, a number of filaments can be formed simultaneously, optionally sized with the coating agent and then bundled into what is called a strand. Alternatively, the strand itself can be first formed of filaments and then optionally sized.

Cyanate esters are compounds generally based on a phenol or a novolac derivative, in which the hydrogen atom of the phenolic OH group is substituted by a cyanide group (—OCN). Suitable cyanate esters include those described in U.S. Pat. No. 6,245.841 and EP 0396383. In an embodiment, cyanate esters are based on resorcinol, p,p'-dihydroxydiphenyl, o,p'-dihydroxydiphenyl methane, 2,2-bis(4-hydroxyphenyl)propane (bisphenol A), tetramethylbisphenol F, hexafluorobisphenol A, bisphenol E, bisphenol M, dicyclopentadienyl bisphenol, o,p'-dihydroxydiphenyl methane, p,p'-dihydroxydiphenyl propane, p,p'-dihydroxydiphenyl sulfone, p,p'-dihydroxydiphenyl sulfide, p,p'-dihydroxydiphenyl oxide, 4,4'-methylenebis(2,6-dimethyl phenol), p,p', p"-tri-hydroxy triphenyl ethane, dihydroxynaphthalene and novolac resins which contain more than 2 phenol moieties per moleculeor, or a combination thereof.

Cyanate esters can be cured and postcured by heating, either alone, or in the presence of a catalyst. Curing normally occurs via cyclotrimerization (an addition process) of three CN groups to form three- dimensional networks comprising triazine rings. The residual cyanate ester content can be determined quantitatively by methods known in the art, for example, by infrared analysis or by "residual heat of reaction" using a differential scanning calorimeter.

The polymer composites contain a cured cyanate ester. As used herein, a "cured cyanate ester" means that cyanate ester monomers are cured until at least about 70 percent, at least about 80 percent, at least about 85 percent, or at least about 90 percent of the cyanate functional groups are cyclotrimerized. The curing reaction can be conducted at about 150° F. to about 600° F. or about 200° F. to about 500° F. If a catalyst is present, the curing temperature can be lower. Suitable curing catalysts include an active-hydrogen catalyst or transition metal complexes of cobalt, copper, manganese and zinc. Advantageously, cured cyanate esters are controllably degradable in water or brine at elevated temperatures. Without wishing to be bound by theory, it is believed that the degradation of cured cyanate ester occurs via hydrolysis reactions as illustrated in Scheme 1:

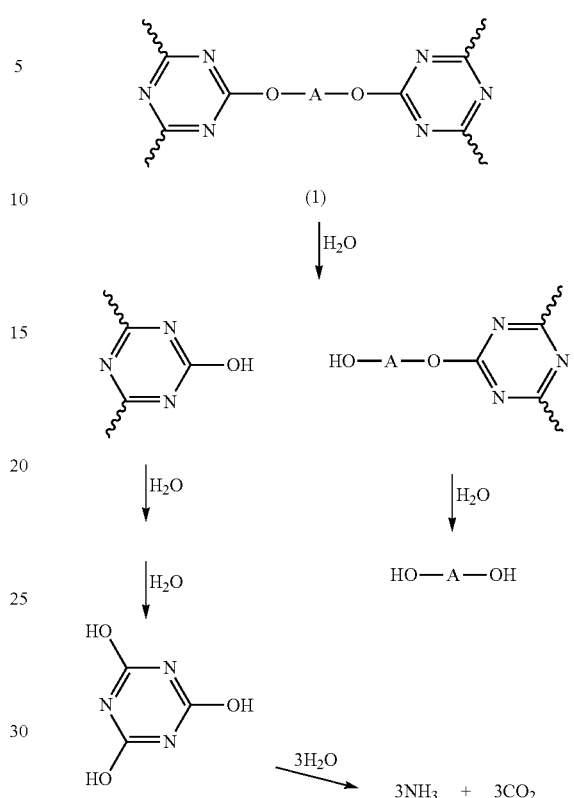

Scheme 1

(See Kasehagen, Leo J., et al. "Hydrolysis and blistering of cyanate ester networks." *Journal of applied polymer science* 64.1 (1997): 107-113)

In Scheme 1, A is an aromatic moiety, As shown in the ustrative scheme, the cured cyanate ester (1) undergoes hydrolysis reactions eventually producing ammonia and a bisphenol HO-A-OH. The dissolution rate of the cured cyanate ester can be controlled by the temperature of the water, brine, or an alkaline solution. For example, an exemplary cured cyanate ester can completely dissolve in 3% KCl brine at 350° F. within 3 days, while the same cyanate ester only shows delamination at 300° F. when exposed to the same brine solution for the same amount of Lime. And when the same cyanate ester is exposed to the same solution at 250° F. for three days, no effects are observed.

Unsaturated polyesters used in the polymer composites are obtained by condensing polyhydric alcohol with at least one polycarboxylic acid and/or anhydride of polycarboxylic acid to form a condensation product, then dissolving the condensation product in a vinyl unsaturated monomer. Unsaturated polyesters are known and suitable unsaturated polyesters include those described in U.S. Pat. No. 8,877, 841.

Examples of the unsaturated dicarboxylic acids and/or their anhydrides include maleic acid, maleic anhydride, fumaric acid, itaconic acid, itaconic acid anhydride, and the like. Examples of the saturated dicarboxylic acids and/or their anhydrides include phthalic acid, phthalic anhydride, halogenated phthalic anhydride, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-dodecanedioic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, and dialkyl esters thereof. These may be used singly or in a combination of two or more polycarboxylic acids. For example, the acids can be a combination of unsaturated dicarboxylic acids and saturated dicarboxylic acids.

Examples of polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, neopentyl glycol, hydrogenated bisphenol A, 1,4-butanediol, adducts of bisphenol A with propylene oxide or ethylene oxide, 1,2,3,4-tetrahydroxybutane, glycerin, trimethylolpropane, 1,3-propanediol, 1,2-cyclohexane glycol, 1,3-cyclohexane glycol, 1,4-cyclohexane glycol, 1,4-cyclohexanedimethanol, paraxylene glycol, bicyclohexyl-4,4'-diol, 2,6-decalin glycol, 2,7-decalin glycol, and the like. These may be used singly or in a combination of two or more polyhydric alcohols.

Examples of vinyl monomers include styrene, vinyl toluene, chlorostyrene, diallyl phthalate, triallyl cyanurate, methyl methacrylate, and the like. These may be used singly or in a combination of two or more monomers.

In a specific embodiment, the acid anhydride comprises maleic anhydride, phthalic anhydride, dicyclopentadiene, isophthalic acid or a combination thereof, the dihydric alcohol comprises propylene glycol, and the vinyl unsaturated monomer comprises styrene.

The unsaturated polyester can be further crosslinked. Examples of crosslinking agents include polyfunctional vinyl monomers such as divinylbenzene, and polyfunctional (meth)acrylate, other than the above-described vinyl monomers. The crosslinking agent may be used singly or in a combination of two or more crosslinking agents.

Vinyl ester resins are resins having unsaturated sites only in the terminal position. The unsaturated sites can be introduced by reaction of epoxy such as diglycidyl ether of bisphenol-A, epoxies of phenol-novolac type, or epoxies based on tetrabromobrisphenol-A with (meth)acrylic acid or (meth)acrylamide The vinyl ester can be further crosslinked. Examples of crosslinking agents include polyfunctional vinyl monomers such as divinylbenzene, and polyfunctional (meth)acrylate, other than the above-described vinyl monomers. The crosslinking agent may be used singly or in a combination of two or more crosslinking agents.

The amounts of the polymer component and the dissolvable glass component can be adjusted to balance the disintegration rate and the desirable physical properties. Generally, polymer composites having a lower polymer/dissolvable glass ratio are likely to have a higher dissolution rate and a higher mechanical strength. However, the presence of large amounts of dissolvable glass can make the composites too brittle to be useful for certain applications. In an embodiment, the weight ratio of the polymer component relative to the dissolvable glass in the polymer composite is about 10:1 to about 1:2, about 3:1 to about 1:1.5, or about 2:1 to about 1:1.5, or about 2:1 to about 1:1.

An additive composition can be used, comprising one or more additives selected to achieve desired properties, with the proviso that the additive(s) are also selected so as to not significantly adversely affect a desired property of the polymer composites. The additive composition or individual additives can be mixed at a suitable time during the mixing of the components for forming the polymer composites. Exemplary additives include one or more of the following: CaO; MgO; Mg; Zn; a formate of sodium or potassium; an octoate of Zn or Mn; a naphthenate of Zn or Mn; aramid fibers; nylon fibers; cellulosic biodegradable fibers; a water soluble or biodegradable polymer different from the polymer component such as a polylactic acid; a polyvinyl alcohol; or a polyglycolic acid. The total amount of the additives can be about 0.01 wt % to about 70 wt %, or about 0.1 wt % to about 50 wt. %, or about 0.1 wt % to about 30 wt %, or about 0.1 to about 20 wt. % each based on the total weight of the polymer composites.

The controlled rate of disintegration can be obtained by varying the loading of the dissolvable glass component. A higher amount of the disintegrable or dissolvable glass can result in a higher dissolution rate. The disintegration rate can also be adjusted by tailoring the composition of the dissolvable glass. Generally, the higher the alkali content of the dissolvable glass, the higher the disintegration rate will be. Moreover, glass fibers having smaller diameters also have a higher disintegration rate. Adjusting the temperature, the pressure, and the pH of the selective fluid can further tailor the disintegration rate of the polymer composite or the articles formed therefrom. The composites dissolve faster at higher temperatures, higher pressures, and higher pH values. Using different degradable polymers can also change the dissolution rate. Additives can be selected to adjust the dissolution rate. For example, the presence of CaO, MgO, Mg, Zn, $Ca(OH)_2$, $Mg(OH)_2$, a formate of sodium or potassium, an octoate of Zn or Mn or Cu or Co, a naphthenate of Zn or Mn or Cu or Co can increase the dissolution rate of the polymer composites whereas the presence of aramid fibers or nylon fibers can reduce the dissolution rate of the polymer composites.

The polymer composites are manufactured by compressing a composition comprising the polymer, the dissolvable glass, and the optional additives as disclosed herein at a temperature of about 20° C. to about 250° C. and a pressure of about 15 psi to about 30,000 psi, about 500 psi to about 30,000 psi, or about 1,000 psi to about 5000 psi.

The obtained polymer composites can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the polymer composites can be directly molded to the useful shape by choosing the molds having the desired shape.

As mentioned above, the polymeric composition is used to produce articles that can be used as tools or implements, e.g., in a downhole environment. Non-limiting examples of the articles include frac balls, shadow frag plugs such as those for perf-and-plug job, dissolvable bridge plugs, dissolvable gas valve plugs, and dissolvable isolation plugs. The polymeric compositions can be used to form the entire plug or can be a support tool. In another embodiment, combinations of the articles are used together. These cost-effective polymer-based tough tools have strengths to bear load during plug applications and dissolve away to create an unobstructed pathway when treated with selective fluid formulations, making perf-and-plug jobs intervention-less operations.

The article can be a downhole tool. In an embodiment, the downhole tool is a single component. In another embodiment the downhole tool inhibits flow. In yet another embodiment, the downhole tool is pumpable within a downhole environment.

Exemplary downhole tools include flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, or shear screws.

Pumpable downhole tools include plugs, direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, or darts.

The downhole tools that inhibit flow include seals, high pressure beaded frac screen plugs, screen basepipe plugs, coatings for balls and seats, compression packing elements, expandable packing elements, O-rings, bonded seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, or sleeves.

The articles comprising the polymer composites as disclosed herein have excellent mechanical properties. A sample of the polymer composite according to an embodiment of the disclosure has a compressive strength of 41.88 ksi measured according to ASTM D 6641, a tensile strength of 15.83 ksi measured according to ASTM D 3039, a tensile modulus of 3.62 Msi, measured according to ASTM D 3039, and a strain-to-failure of 0.48%, measured according to ASTM D 3039. Accordingly, in an embodiment, a polymer composite as disclosed herein has a compressive strength of greater than about 40 ksi measured according to ASTM D 6641. The polymer composite can also have a tensile strength of greater than about 15 ksi measured according to ASTM D 3039. In another embodiment, the polymer composite has a tensile modulus of greater than about 3 Msi, measured according to ASTM D 3039.

Figure 2:
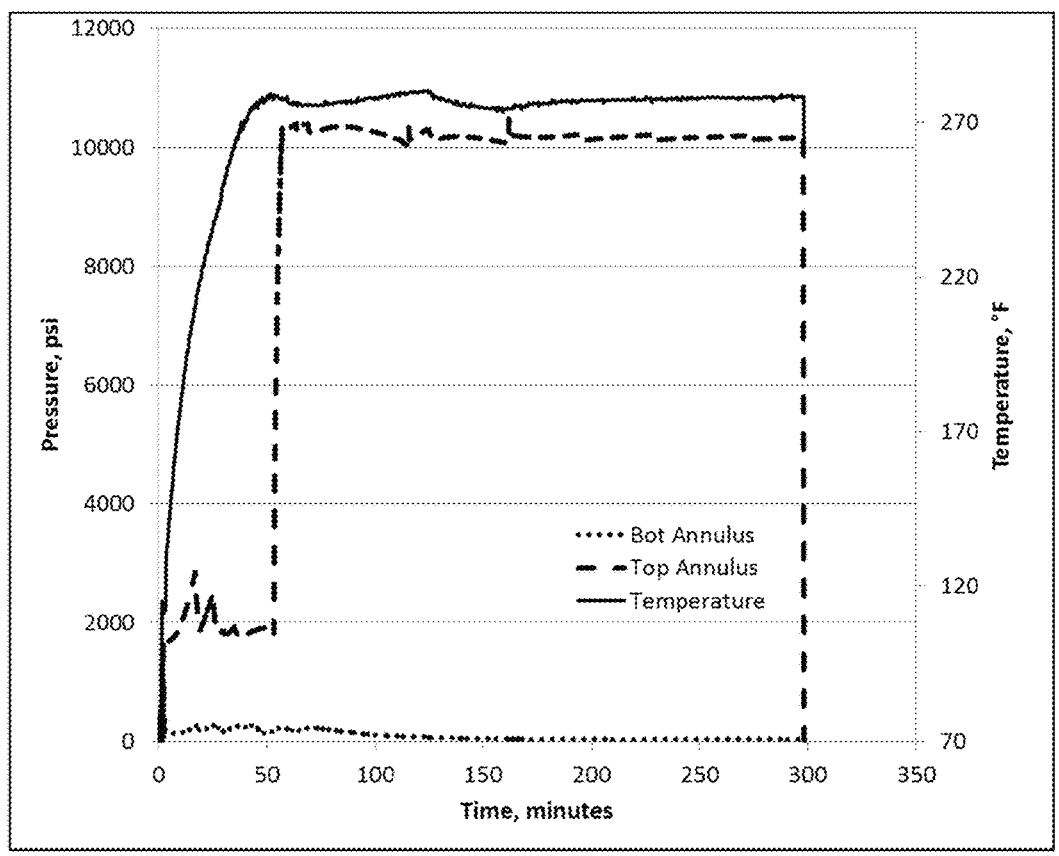
FIG. 2 shows pressure test conditions and pressure test results on the polymer composite ball of FIG. 1, where bot annulus means the bottom annulus of the test fixture, top annulus means the top annulus of the test fixture, and together the two annuli provides a differential pressure held by the polymer composite ball.
Figure 3:
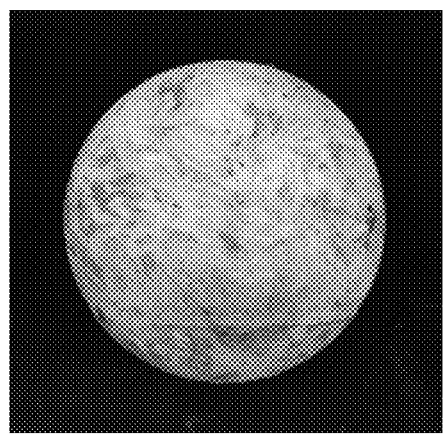
FIG. 3 is a picture of a polymer composite ball of FIG. 1 after the pressure test.

Articles comprising the polymer composites can also have excellent pressure and temperature resistance. FIG. 1 illustrates a polymer composite ball having a diameter of 2.625 inches. The ball is subjected to a pressure test. The test conditions and the results are shown in FIG. 2. A picture of the polymer composite ball after the pressure test is shown in FIG. 3. The results indicate that the polymer composite ball can withstand a pressure differential of 10,000 psi at 275° C. for 4 hours.

Methods to disintegrate a polymer composite or an article comprising the polymer composite comprises: exposing the polymer composite or the article to an aqueous fluid at a temperature of about 25° C. to about 300° C., about 65° C. to about 250° C., or about 65° C. to about 150° C. or about 175° C. to about 250° C. The pressure can be about 100 psi to about 15,000 psi The aqueous fluid includes water, brine, an alkaline solution, or a combination thereof. The brine can include NaCl, KCl, NaBr, $MgCl_2$, $CaCl_2$, $CaBr_2$, $ZnBr_2$, $NH_4Cl$, sodium formate, cesium formate, and the like. The alkaline solution can include an alkaline salt of one or more of the following: Na; K; Ca; Mg; Li; or Ce. The salts present in the brine or the alkaline solution can be in an amount of from about 0.5 weight percent (wt. %) to about 50 wt. %, specifically about 1 wt. % to about 40 wt. %, and more specifically about 1 wt. % to about 25 wt. %, based on the weight of the brine or the alkaline solution.

Set forth below are various embodiments of the disclosure.

Embodiment 1. A disintegrable polymer composite comprising: a polymer component comprising one or more of the following: a cured cyanate ester; a crosslinked unsaturated polyester; or a crosslinked vinyl ester resin and dissolvable glass comprising about 55 to about 80 wt. % of $SiO_2$, 0 to about 35 wt. % of $Na_2O$, 0 to about 35 wt. % of $K_2O$, 0 to about 20 wt. % of CaO, 0 to about 10 wt. % of MgO, provided that the sum of the weights of $Na_2O$ and $K_2O$ is about 20 wt. % to about 40 wt. %, wherein each weight percent is based on the total weight of the dissolvable glass.

Embodiment 2. The disintegrable polymer composite of Embodiment 1, wherein the weight ratio of the polymer component relative to the dissolvable glass is about 10:1 to about 1:2.

Embodiment 3. The disintegrable polymer composite of Embodiment 1 or Embodiment 2, wherein the dissolvable glass comprises one or more of the following: continuous glass fiber; chopped glass fiber; a glass fabric; a glass fiber mat; a glass fiber sheet; a glass fiber braid; a glass fiber roving; a glass fiber prepreg product; a glass powder; glass beads; or glass flakes.

Embodiment 4. The disintegrable polymer composite of any one of Embodiments 1 to 3, wherein the dissolvable glass comprises glass fiber.

Embodiment 5. The disintegrable polymer composite of Embodiment 4, wherein the dissolvable glass fiber has an average diameter of about 5 microns to about 500 microns.

Embodiment 6. The disintegrable polymer composite of Embodiment 4, wherein the dissolvable glass comprises continuous glass fiber.

Embodiment 7. The disintegrable polymer composite of any one of Embodiments 1 to 6, wherein the dissolvable glass comprises one or more of sodium silicate or potassium silicate.

Embodiment 8. The disintegrable polymer composite of any one of Embodiments 1 to 7, wherein the glass is sodium silicate of formula $Na_2O \cdot SiO_2$, wherein the weight ratio of $SiO_2$ relative to $Na_2O$ is about 3.22:1 to about 1:1.

Embodiment 9. The disintegrable polymer composite of any one of Embodiments 1 to 8, wherein the polymer component comprises a cured cyanate ester.

Embodiment 10. The disintegrable polymer composite of Embodiment 9, wherein at least 70 percent of the cyanate functional groups are cyclotrimerized.

Embodiment 11. The disintegrable polymer composite of Embodiment 9 or Embodiment 10, wherein the cured cyanate ester is derived from one or more of the following: resorcinol; p,p'-dihydroxydiphenyl; o,p'-dihydroxydiphenyl methane; 2,2-bis(4-hydroxyphenyl)propane (bisphenol A); tetramethylbisphenol F; hexafluorobisphenol A; bisphenol E; bisphenol M; dicyclopentadienyl bisphenol; o,p'-dihydroxydiphenyl methane; p,p'-dihydroxydiphenyl propane; p,p'-dihydroxydiphenyl sulfone; p,p'-dihydroxydiphenyl sulfide; p,p'-dihydroxydiphenyl oxide; 4,4'-methylenebis(2, 6-dimethyl phenol); p,p',p"-tri-hydroxy triphenyl ethane; dihydroxynaphthalene; or a novolac polymer containing more than two phenol moieties per moleculeor.

Embodiment 12. The disintegrable polymer composite of any one of Embodiments 1 to 8, wherein the polymer component comprises a crosslinked unsaturated polyester.

Embodiment 13. The disintegrable polymer composite of any one of Embodiments 1 to 8, wherein the polymer component comprises a crosslinked vinyl ester.

Embodiment 14. The disintegrable polymer composite of any one of Embodiments 1 to 13, wherein the composite further comprises an additive comprising one or more of the following: CaO; MgO; Ca(OH)$_2$; Mg(OH)$_2$; Mg; Zn; a formate of sodium or potassium; an octoate of Zn or Mn or Cu or Co; a naphthenate of Zn or Mn or Cu or Co; aramid fibers; nylon fibers; cellulosic biodegradable fibers; a water soluble or biodegradable polymer different from the polymer component.

Embodiment 15. An article comprising a polymer composite of Embodiments 1 to 14.

Embodiment 16. The article of Embodiment 15, wherein the article is a pumpable downhole tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

Embodiment 17. The article of Embodiment 15, wherein the article is downhole tool that inhibits flow comprising a seal, a high pressure beaded frac screen plug, a screen basepipe plug, a coating for a balls and a seat, a compression packing element, an expandable packing element, an O-ring, a bonded seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

Embodiment 18. A method to disintegrate an article of Embodiment 15, the method comprising: exposing the article to an aqueous fluid at a temperature of about 25° C. to about 300° C.

Embodiment 19. The method of Embodiment 18, wherein the article is exposed to the aqueous fluid at a pressure of about 100 psi to about 15,000 psi.

Embodiment 20. The method of Embodiment 18 or Embodiment 19, wherein the aqueous fluid is water or brine or an alkaline solution of one or more of the following: Na; K; Ca; Mg; Li; or Ce.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A disintegrable polymer composite comprising:
a polymer component comprising one or more of the following: a cured cyanate ester; a crosslinked unsaturated polyester; or a crosslinked vinyl ester resin and
dissolvable glass comprising about 55 to about 80 wt. % of SiO$_2$, 0 to about 35 wt. % of Na$_2$O, 0 to about 35 wt. % of K$_2$O, 0 to about 20 wt. % of CaO, 0 to about 10 wt. % of MgO, provided that the sum of the weights of Na$_2$O and K$_2$O is about 20 wt. % to about 40 wt. %, wherein each weight percent is based on the total weight of the dissolvable glass, the dissolvable glass having a solubility in water of greater than 15 grams/millimeter at 25° C.;
wherein the composite further comprises an additive different from the dissolvable glass, the additive comprising one or more of the following: CaO; MgO; Ca(OH)$_2$; Mg(OH)$_2$; Mg; Zn; a formate of sodium or potassium; an octoate of Zn or Mn or Cu or Co; a naphthenate of Zn or Mn or Cu or Co; aramid fibers; nylon fibers; cellulosic biodegradable fibers; a water soluble or biodegradable polymer different from the polymer component.

2. A disintegrable polymer composite comprising:
a polymer component comprising one or more of the following: a cured cyanate ester; a crosslinked unsaturated polyester; or a crosslinked vinyl ester resin and
dissolvable glass comprising about 55 to about 80 wt. % of SiO$_2$, 0 to about 35 wt. % of Na$_2$O, 0 to about 35 wt. % of K$_2$O, 0 to about 20 wt. % of CaO, 0 to about 10 wt. % of MgO, provided that the sum of the weights of Na$_2$O and K$_2$O is about 20 wt. % to about 40 wt. %, wherein each weight percent is based on the total weight of the dissolvable glass,
wherein the weight ratio of the polymer component relative to the dissolvable glass is about 10:1 to about 1:2.

3. The disintegrable polymer composite of claim 1, wherein the dissolvable glass comprises one or more of the following: continuous glass fiber; chopped glass fiber; a glass fabric; a glass fiber mat; a glass fiber sheet; a glass fiber braid; a glass fiber roving; a glass fiber prepreg product; a glass powder; glass beads; or glass flakes.

4. The disintegrable polymer composite of claim 1, wherein the dissolvable glass comprises glass fiber.

5. The disintegrable polymer composite of claim 4, wherein the dissolvable glass fiber has an average diameter of about 5 microns to about 500 microns.

6. The disintegrable polymer composite of claim 4, wherein the dissolvable glass comprises continuous glass fiber.

7. The disintegrable polymer composite of claim 1, wherein the dissolvable glass comprises one or more of sodium silicate or potassium silicate.

8. A disintegrable polymer composite comprising:
a polymer component comprising one or more of the following: a cured cyanate ester; a crosslinked unsaturated polyester; or a crosslinked vinyl ester resin and
dissolvable glass comprising about 55 to about 80 wt. % of SiO$_2$, 0 to about 35 wt. % of Na$_2$O, 0 to about 35 wt. % of K$_2$O, 0 to about 20 wt. % of CaO, 0 to about 10 wt. % of MgO, provided that the sum of the weights of Na$_2$O and K$_2$O is about 20wt. % to about 40 wt. %, wherein each weight percent is based on the total weight of the dissolvable glass, wherein the glass is sodium silicate of formula $Na_2O \cdot SiO_2$, wherein the weight ratio of $SiO_2$ relative to $Na_2O$ is about 3.22:1 to about 1:1.

9. The disintegrable polymer composite of claim 1, wherein the polymer component comprises a cured cyanate ester.

10. A disintegrable polymer composite comprising:
a polymer component comprising one or more of the following: a cured cyanate ester; a crosslinked unsaturated polyester; or a crosslinked vinyl ester resin,
dissolvable glass comprising about 55 to about 80 wt. % of $SiO_2$, 0 to about 35 wt. % of $Na_2O$, 0 to about 35 wt. % of $K_2O$, 0 to about 20 wt. % of CaO, 0 to about 10 wt. % of MgO, provided that the sum of the weights of $Na_2O$ and $K_2O$ is about 20 wt. % to about 40 wt. %, wherein each weight percent is based on the total weight of the dissolvable glass,
wherein the polymer component comprises a cured cyanate ester, and at least 70 percent of the cyanate functional groups are cyclotrimerized.

11. The disintegrable polymer composite of claim 9, wherein the cured cyanate ester is derived from one or more of the following: resorcinol; p,p'-dihydroxydiphenyl; o,p'-dihydroxydiphenyl methane; 2,2-bis(4-hydroxyphenyl)propane (bisphenol A); tetramethylbisphenol F; hexafluorobisphenol A; bisphenol E; bisphenol M; dicyclopentadienyl bisphenol; o,p'-dihydroxydiphenyl methane; p,p'-dihydroxydiphenyl propane; p,p'-dihydroxydiphenyl sulfone; p,p'-dihydroxydiphenyl sulfide; p,p'-dihydroxydiphenyl oxide; 4,4'-methylenebis(2,6-dimethyl phenol); p,p ',p "-trihydroxy triphenyl ethane; dihydroxynaphthalene; or a novolac polymer containing more than two phenol moieties per moleculeor.

12. The disintegrable polymer composite of claim 1, wherein the polymer component comprises a crosslinked unsaturated polyester.

13. The disintegrable polymer composite of claim 1, wherein the polymer component comprises a crosslinked vinyl ester.

14. The disintegrable polymer composite of claim 2, wherein the composite further comprises an additive comprising one or more of the following: CaO; MgO; $Ca(OH)_2$; $Mg(OH)_2$; Mg; Zn; a formate of sodium or potassium; an octoate of Zn or Mn or Cu or Co; a naphthenate of Zn or Mn or Cu or Co; aramid fibers; nylon fibers; cellulosic biodegradable fibers; a water soluble or biodegradable polymer different from the polymer component.

15. An article comprising a polymer composite of claim 1.

16. The article of claim 15, wherein the article is a pumpable downhole tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

17. The article of claim 15, wherein the article is downhole tool that inhibits flow comprising a seal, a high pressure beaded frac screen plug, a screen basepipe plug, a coating for a balls and a seat, a compression packing element, an expandable packing element, an O-ring, a bonded seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

18. A method to disintegrate an article of claim 15, the method comprising:
exposing the article to an aqueous fluid at a temperature of about 25° C. to about 300° C.

19. The method of claim 18, wherein the article is exposed to the aqueous fluid at a pressure of about 100 psi to about 15,000 psi.

20. The method of claim 18, wherein the aqueous fluid is water or brine or an alkaline solution of one or more of the following: Na; K; Ca; Mg; Li; or Ce.

21. A method to disintegrate an article of claim 1, the method comprising: exposing the article to an aqueous fluid at a temperature of about 25° C. to about 300° C.

* * * * *